(12) United States Patent  
Cho

(10) Patent No.: US 6,499,099 B1  
(45) Date of Patent: Dec. 24, 2002

(54) CENTRAL PROCESSING UNIT METHOD AND APPARATUS FOR EXTENDING GENERAL INSTRUCTIONS WITH EXTENSION DATA OF AN EXTENSION REGISTER

(75) Inventor: Kyung Youn Cho, Pusan (KR)

(73) Assignee: Asia Design Co., Ltd., Seoul (KR)

( * ) Notice: Subject to any disclaimer, the term of this patent is extended or adjusted under 35 U.S.C. 154(b) by 0 days.

(21) Appl. No.: 09/238,234

(22) Filed: Jan. 27, 1999

(30) Foreign Application Priority Data

Nov. 20, 1998 (KP) ............................................. 98-49999

(51) Int. Cl.⁷ .......................... G06F 15/00; G06F 15/82; G06F 9/455
(52) U.S. Cl. ........................... 712/210; 712/23; 712/227
(58) Field of Search ................................. 712/227, 233, 712/23, 231, 32, 210

(56) References Cited

U.S. PATENT DOCUMENTS 4,445,177 A * 4/1984 Bratt et al. .................. 712/245
4,694,391 A * 9/1987 Guttage et al. ................ 712/32
4,794,517 A * 12/1988 Jones et al. .................... 712/32
6,122,721 A * 9/2000 Goddard et al. .............. 712/23
6,308,258 B1 * 10/2001 Kubota et al. .............. 712/210

* cited by examiner

Primary Examiner—Daniel H. Pan
Assistant Examiner—Te Chen
(74) Attorney, Agent, or Firm—Wilson Sonsini Goodrich & Rosati; Kenta Suzue

(57) ABSTRACT

A central processing unit having an extension instruction comprises a memory address, an offset and a fixed length instruction of varying immediate data. The central processing unit comprises a general register, a special register, a register file constituted as an inner register, a function block for executing the calculation function; an instruction register for memorizing the instruction, a control block for generating/outputting a control signal to the instruction register and a plurality of status flags, in which the special register enables access by a programmer and includes an extension data field for memorizing extension data or an extension register having the extension data field as one element and an extension flag for changing its status when the instruction memorizing the extension data in the extension register is executed and having one or a plurality of bits that is accessible to a programmer.

25 Claims, 4 Drawing Sheets

CENTRAL PROCESSING UNIT METHOD AND APPARATUS FOR EXTENDING GENERAL INSTRUCTIONS WITH EXTENSION DATA OF AN EXTENSION REGISTER

BACKGROUND OF THE INVENTION

The present invention is related to provide a central processing unit having a fixed length instruction for varying memory addresses, offsets and immediate data.

PRIOR ART

As it is apparent from FIG. 5, a conventional central processing unit comprises a register file 7, including a GPR (General Purpose Register) configured to be suitable to an architecture that is a region to ease the access of a user and a SPR (Special Purpose Register) used for a special purpose; an instruction register 4 for latching an instruction patched from a memory; a decode/control portion 5 for decoding an OP code and an operand latched in the instruction register 4 and producing a predetermined control signal according to an instruction; a operating portion 6 for processing the instruction decoded in the decode/control portion 5; a memory data register 1 for latching/buffering data when writing data in the memory or reading data from the memory; a memory address register 2 for latching/outputting an address counted in a program counter; and a control signal register 3 for buffering a control signal input from an outside source.

The instruction of the central processing unit called "Machine Language", comprises an OP code which is expressed in an arrangement of binary bits and represents operation, and an operand which is subject to be operated by the OP code.

Seeing an ADD instruction as an example for OP codes and operands, 'A=B+C' is to add 'B' and 'C' to each other and store its result at 'A'. Herein, '+' is an OP code for representing the operation, and 'A', 'B' and 'C' are operands as objects to be operated upon. The above expression may be, '0001 0000 0001 0010' if represented in a machine language, in which '0001' is an OP code that symbolizes '+' '0000', '0001' and '0010' are operands that A, B and C are symbolized. The representation of the binary digit may be often embodied as a hexadecimal digit because reading is difficult. The representation of the hexadecimal digit in the above example becomes '0x1012'. In the machine language, the operand includes a register, a memory address, an offset and immediate data.

The number of the registers is limited to 32 in many cases. For example, if the number of registers is 16, it can be represented as an operand of 4 bits (2**4=16). But, in case of a memory address, a 32-bit central processing unit can use a memory of 4 G bytes. It needs a 32-bit address for its representation. Therefore, the operand length defining it becomes longer. In case of the offset and the immediate data, the operand length becomes longer similar to the case of the memory. If the operand length becomes longer, the length of the machine language gets longer. If the length of the machine language becomes longer, the program size is increased and the efficiency becomes bad.

Because of these reasons, each of the central processing units should have a technical method for representing the operand, efficiently. 80386 used in IBM-PC has a Multi-Byte Length Instruction. For example, the instruction machine language 'MOVE' of 80386 is defined based on the operand length as follows:

| MOV AL, | 12 | → | B0 12 |
| MOV AX, | 1234 | → | B8 34 12 |
| MOV EAX, | 12345678 | → | 66B8 78 56 34 12 |

Also, MC68000 has a Multi 16-bit Length Instruction similar to 80386. The variable Length Instruction, as described above, has an advantage of being able to represent any length of an operand, but has disadvantages in that it is difficult to process the instruction decoding and the exceptional situation, etc., because the length of the machine language is changed. The central processing unit having the variable length instruction is called CISC (Complex Instruction Set Computer).

On the other hand, in RISC (Reduced Instruction Set Computer) the length of the machine language is fixed. Given one example, MIPS-R3000, SPARC, ARM-7, etc. has a 32-bit fixed length instruction, SH-3 manufactured by Hitachi Co. has a 16-bit fixed length instruction. These fixed length instructions ease the instruction decoding, the exception process and the adoption of a pipe line to realize the high performance of the central processing unit because of the constant length of the machine language. On the contrary, it accompanies the restriction to the operand length because the instruction length is fixed.

For example, MIPS-R3000 has a memory of a 32-bit capacity. Nevertheless, an offset capable of representing in a machine language is a 16-bit and is a 32-bit central processing unit but the length of an immediate constant is limited to 16-bit. Thus, it becomes one of the reasons the program coding is difficult and its performance is deteriorating.

Also, an instruction, 'MOVE', is an operation for copying the content of one register to another register, in which the register operand has a 5-bit length because MIPS-R3000 has 32 registers. Assuming that the OP code for representing 'MOVE' is defined into a 6-bit, the fixed length instruction can be defined into 16-bit instruction. But, in order to use the fixed length instruction, 16-bit representable instruction is represented as a 32-bit one. But, the 32-bit fixed length instruction has disadvantages that the operand length is limited and has an unnecessary lengthy instruction.

Consider another example of TR-4101, TR-4101 has a 16-bit fixed length instruction and the function of extending a part of the fixed length instruction and the operand. For example, an instruction 'LOAD' forcing data to be fetched from a memory includes an OP code for representing 'LOAD' and a target register representing a register fetched and stored, an index register indicating the positions of an operand and a memory and an offset operand representing the offset from the operand and index. In order to represent these OP codes and various kind of operands on a 16-bit length instruction, TR-4101 limits the offset to a 5-bit. But, the 5-bit offset is not enough to represent the memory position. So, TR-4101 uses an instruction, 'EXTEND'.

The instruction, 'EXTEND', includes an OP code of 5 bits and an immediate constant operand of 11 bits. Herein, the 11-bit immediate constant operand is interpreted according to the instruction positioned next to the instruction 'EXTEND'. For example, when the 'LOAD' next to the instruction 'EXTEND' appears, the 11-bit immediate constant operand of the instruction 'EXTEND' and a 5-bit offset of the instruction 'LOAD' concatenated each other to represent the 16-bit offset.

The instruction extension technology of TR-4101 is only to extend the offset and the immediate constant into a 16-bit and does not resolve the limitation of the operand length that the conventional RISC central processing unit has. The operand extendable instruction makes the pointing-out of the operand different according to the existence of the instruction 'EXTEND'. The instruction that the preceded instruction 'EXTEND' is concatenated is taken into one instruction. In other words, it has disadvantages that the exception process next to the instruction 'EXTEND' cannot be operated and the request in response to the peripheral apparatus cannot be processed in a real time.

Accordingly, in order to resolve these disadvantages and problems, an object of the invention is to provide a central processing unit having an extension instruction which takes advantages from a CISC and a RISC to represent all length of memory addresses and offsets and immediate data, to simplify an instruction decoder circuit using a fixed instruction as well as to facilitate the exception process, so that a pipe line and a MMU (Memory Management Unit) are simplified.

Another object of the present invention is to provide a central processing unit having an extension instruction to be able to return to the next routine which the process of extension instruction which the process of extension instruction is stopped after performing immediately an exception process procedure even though an exceptional situation next to the extension instruction happens.

SUMMARY OF THE INVENTION

In order to accomplish these objects, a central processing unit having an extension instruction, including a register file, the collection of registers that is a small scale of the memory unit in which the access speed is fast; an inner bus connected to the register file to transfer/receive information; an outer bus buffer connected to the inner bus to connect an outer bus thereto; a function block connected to the inner bus and for executing the calculation function; an instruction register connected to the inner bus and for memorizing the instruction in the procedure of being executed; a control block connected to the instruction register and for interpreting the instruction and generating/outputting a control signal to the register file, the inner bus, the outer bus buffer, the function block and the instruction register; and one or a plurality of status flags for representing a calculation resulting status of the function block, a status of the instruction register, a status of the control block, in which the register file includes one or a plurality of accessible general registers for storing calculation source data and calculation resulting in and memorizing memory addresses, one or a plurality of special registers for memorizing information necessary to the operation of the central processing unit, and one or a plurality of inner registers for memorizing special functions necessary for the operation of the central processing unit at a register that the programmer is not accessible, the calculation interim procedures, etc.; the status flag includes ones that a programer is accessible or not accessible to and a program counter for memorizing the memory address that the program proceeded by one special register is stored; the program address that the program counter points out is output to the inner bus; the program address output to the inner bus is output through the outer bus buffer to the outer memory address memorizing the program; the instruction is read from the outer memory pointed out in the described method and transferred through the outer bus buffer to the inner bus; the instruction is stored in the instruction register that is one of the inner registers, interpreted in the control block to generate the control signal, to execute the instruction and change a related status flag, in which the instruction stored in the instruction register and interpreted in the control block includes only the OP code for representing the operation or the OP codes and an operand field having one or a plurality of operands subjected to be operated with respect to the system operation; the OP code and the operand include one or a plurality of binary bits, in which the operand is interpreted/executed into an address operand representing the memory address, an offset operand representing the offset from the memory address memorized in the general register or the special register, an immediate constant operand representing an immediate constant for use in the calculation or the memory address or the control, or a register operand representing the register, etc., furthermore comprising: an extension register having only an extension data field, or an extension register having the extension data field as one element for memorizing extension data in an accessible register, in which the instruction, including the OP code for representing the operation of memorizing the extension data in the extension data field of the extension register and the immediate constant operand, is interpreted in the control block to memorize the immediate constant operand in the extension data field of the extension register, the extension instruction including the OP code and the operand field concatenates the operand field included in the extension instruction in the control block to the extension data memorized in the extension data field of the extension register in order to form a new operand field and is interpreted into/executed instruction having a newly formed operand field.

Also, the modified instruction including an OP code and an operand field concatenates extension data memorized in the extension data field of the extension register to the operand field included in the modified instruction to form a new instruction, so that the newly formed instruction can be interpreted and executed.

Also, according to the invention, the central processing unit having an extension instruction furthermore comprises an extension flag for representing the status of the extension data field of the extension register, which is one of the status flags, including one or a plurality of bits that a programmer has an access, in which the instruction including the OP code for representing the operation of memorizing the extension data in the extension data field of the extension register and the immediate constant operand is interpreted in the control block to memorize the immediate constant operand in the extension data field of the extension register and executed in the control block to change the status of the extension flag; the extensible instruction including the OP code and the operand field is interpreted into/executed instruction having only the operand field included in the extensible instruction in the control block according to the extension flag status, or concatenates the operand field included in the extensible instruction to the extension data memorized in the extension data field of the extension register to form a new operand field and is interpreted into instruction having a newly formed operand field which is executed to execute the extensible instruction in the control block and change the extension flag status.

The invention comprises a central processing unit including an extension register ER, means for representing the status of the extension register, an instruction for storing a value in the ER and an instruction for forcing the operand interpretation to be based differently on the status of the extension register. The invention can realize a central processing unit having a fixed length instruction and for varying the lengths of a memory address, the offset and an immediate constant.

BRIEF DESCRIPTION OF THE DRAWINGS

The invention now will be described in detail with reference to the accompanying drawings, in which.

DETAILED DESCRIPTION OF THE INVENTION

Figure 1:
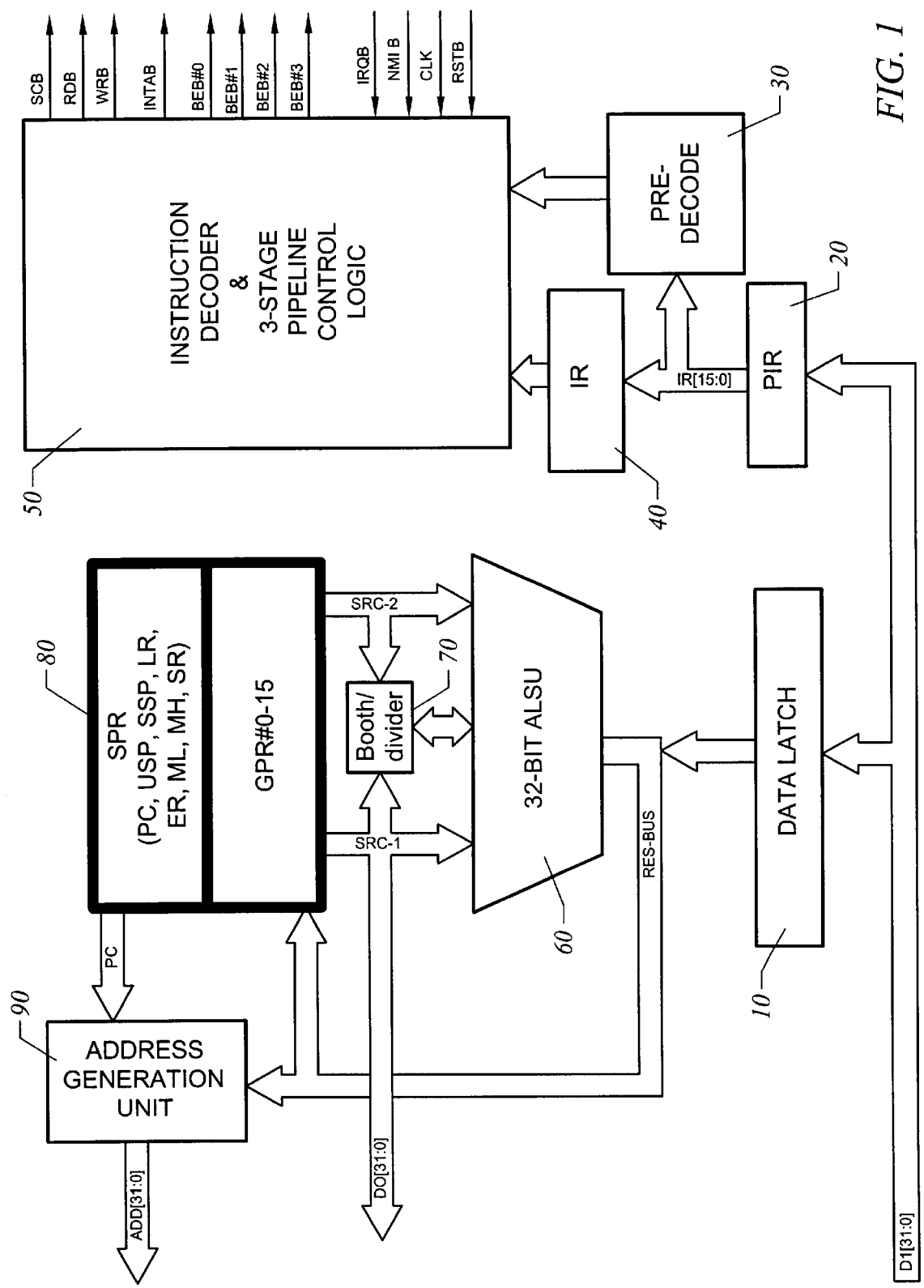
FIG. 1 is a block diagram illustrating a central processing unit according to the invention.

FIG. 1 is a block diagram illustrating an embodiment of a central processing unit having an extension instruction according to the invention, in which the embodiment adapts a MCU (microprogrammed control unit) of a 32-bit architecture. The MCU enables the extension and reduction of a data path and a bus width, and its detailed blocks can be defined into various methods. But the embodiment uses a 32-bit MCU for the purpose of simplifying the explanation.

According to the embodiment of the invention, a 32-bit central processing unit having an extension instruction includes a register file 80, a 32-bit bus, a decoder/control portion 50, an arithmetic logic statement unit 60 (hereinafter called ALSU), a multiplier/divider 70 and an address generating portion 90, in which its instruction includes a 16-bit and uses a three-stage pipe line, and a memory structure includes four 8-bit memories connected in parallel to one another.

From now, the basic function and operation of each element of the 32-bit central processing unit having an extension instruction will be explained.

When the system is reset at first, the MCU reads a starting address from a memory and stores it in a data latch portion 10. Then, the address value is stored in a program counter (PC) in the register file 80. As long as the program is proceeding in turn from the following cycle, the value is increased according to the memory arrangement. The address generating portion 90 refers the value and reads a program that a user wants from the memory. The address generating portion 90 selects elements corresponding to the following instruction and the data memory address, uses them for the sequential or non-sequential proceeding of the program, reads the instruction at the address and latches it in the pre-instruction register 20 to proceed the program in sequence, or takes necessary data from the memory and latches it in the data latch portion 10 to perform the proper operation.

Actually, if the instruction starts to be performed, the instruction for the pipe line is fetched from the pre-instruction register (PIR) 20. The predecoder 30 classifies the instruction into big categories. Herein, big categories are to classify the defined instruction into several similar types based on the number of a pipeline and a method to be executed to determine which status transition is performed. Thereafter, the instruction is latched in the instruction register (IR) 40. The decoder/control portion 50 refers to the latched value and the output from the pre-decoder 30 and determines the status transition of the corresponding instruction to generate a control signal according to each status. The 32-bit ALSU 60 and the multiplier/divider 70 are operated by the control signal to store its output result in the register file 80.

Figure 4:
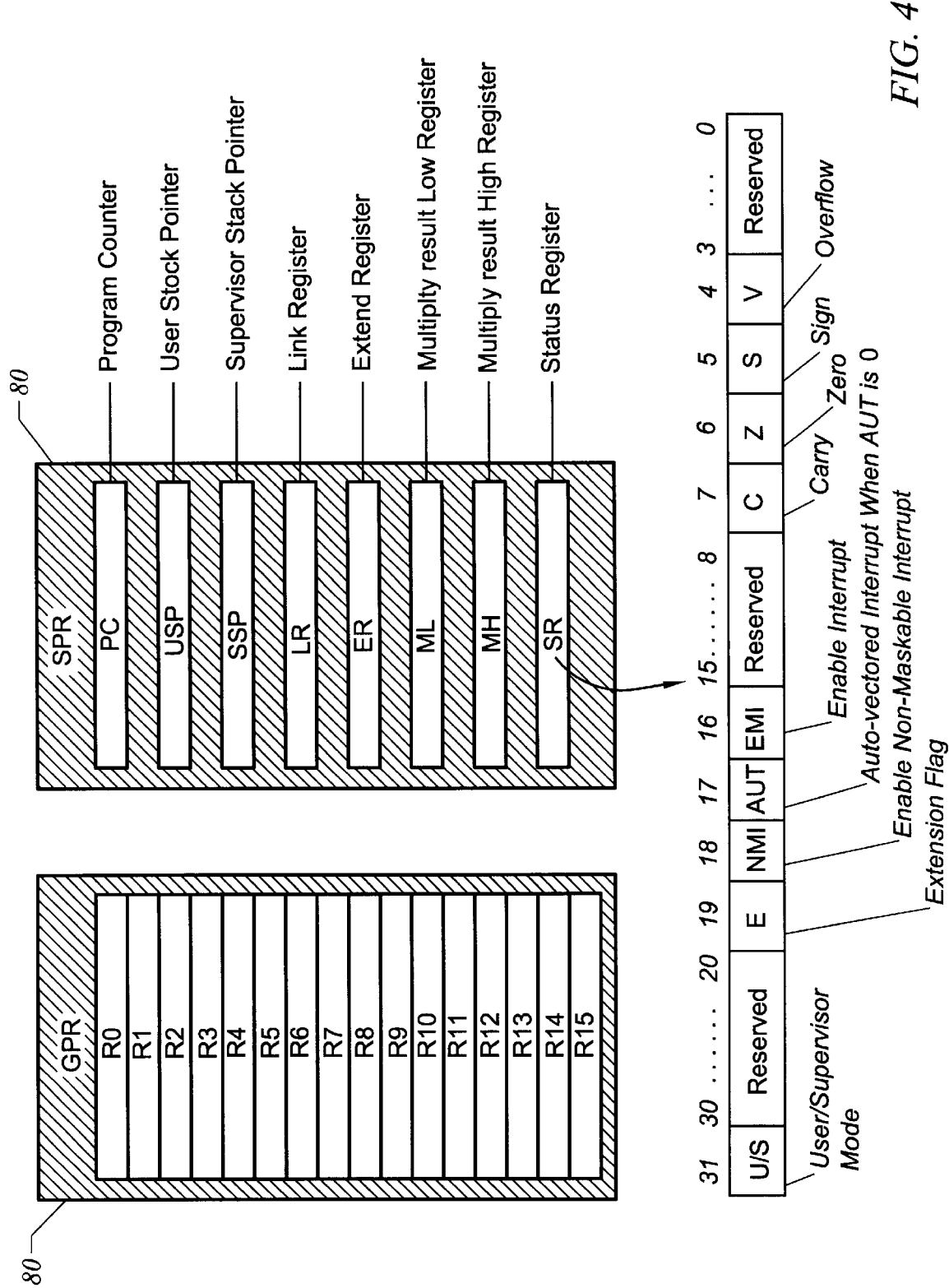
FIG. 4 is a block diagram illustrating an instruction format in which extension flag is set to a status flag.
Figure 5:
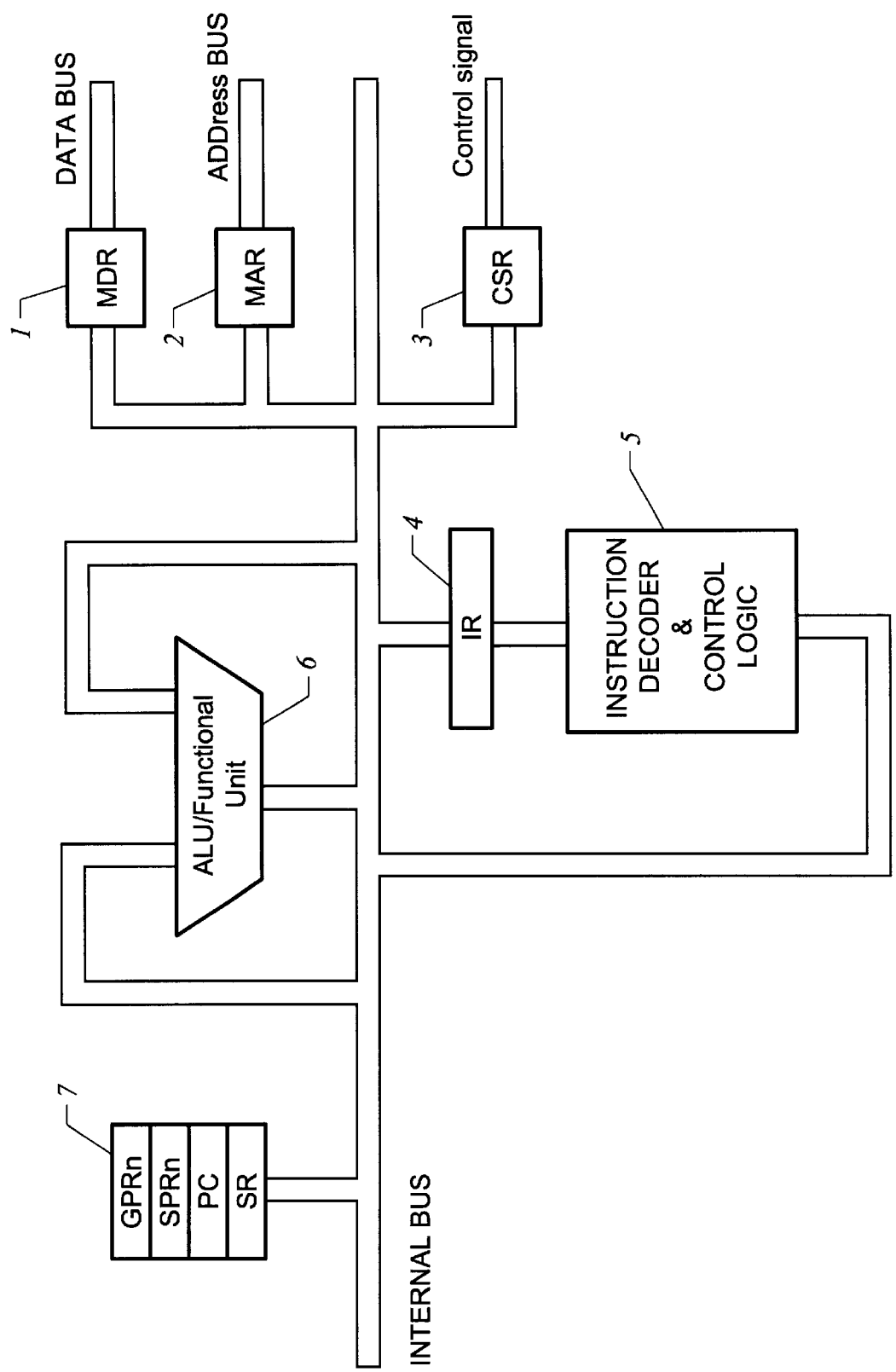
FIG. 5 is a block diagram illustrating a central processing unit of a prior art.

The detailed configuration of the register file 80 is shown in FIG. 4. The register file 80 is divided into GPR (general purpose register) and SPR (special purpose register). The GPR is a region that the user can easily access and includes sixteen 32-bit registers. On the contrary, the SPR is a register which is used for a special purpose and includes a PC (Program Counter), a SP (User/Supervisor Stack Pointer), a LR (Link Register), an ML/MH (Multiply Result Low/High Register), a SR (Status Register), etc. The LR, ML/MH and SR among these registers function as follows:

LR (Link Register): when a branch occurs by the flow of a non-sequential program, the value of the program counter is stored in the memory (Stack Area) as described above. Then, in the case of the distal function, the operation for receiving the address back, immediately, and calling the distal function is easily operated. Considering these points, in the case of calling the distal function, the address is not stored in the memory. Instead, the link register is used for its temporary storage. When the operation of the function is stopped through the above process and the address value is received back, the system performance is enhanced because the memory is not accessed to read.

ML/MH (Multiply Result Low/High Register): in the MCU there exists a multiplier and a divider. Therefore, the two registers are used for temporarily storing the results of their operations.

SR (Status Register): this register is used for storing various status values in the procedure of the calculation like that in all general MCUs, which is a collection of status flags representing the status of the central processing unit.

The central processing unit having an extension instruction according to the invention further comprises an extension register (ER) in the register file 80 and an extension flag representing the extension status of the instruction. In the embodiment, the extension register is arranged in the SPR, but its position is irrelevant to allotting to any place where a programmer is accessible. The flag for representing the extension status also is regardless of the positioning at any place where the programmer has an access, but in the embodiment it is positioned in the SR.

Extension Register (ER): the extension register is used for temporarily storing an offset or immediate data value and producing a predetermined amount of operand. In the embodiment, the extension flag representing the status of the extension register is included in the status register.

The total length of the ER is changed according to the word length of the central processing unit and has the length equal or less than 16 bits in a 16-bit central processing unit, one equal or less than 32 bits in a 32-bit central processing unit and one equal or less than 64 bits in a 64-bit central processing unit. Herein, the 32-bit length of the ER is explained as an example, but it is noted that it is intended to facilitate the explanation not to limit the ER length and the word length of the central processing unit.

The ER should be the shape which has over a 1-bit length that the programmer has access. Some flags and registers in the central processing unit contains ones that is not accessible to the programmer. In the embodiment of the invention, the EF is explained as one bit of the status register, and it is noted that it is intended to make the convenience of the explanation not to limit the embodying aspect of the EF. Also, the central processing unit of the invention stores data in the ER and includes the extension flag (EF) to represent the use or non-use of the extension register and separate instructions to enable the use of the ER, sufficiently, without using the EF. In the embodiment, an example where the EF is used is given.

The central processing unit of the invention has the instruction for storing data in the ER and at the same time, setting the EF at "1", which is so called 'LDERI' for the convenience of the explanation. Also, assuming that the 16-bit fixed length instruction is used in the 32-bit central processing unit and the operand of the instruction 'LDERI' is defined into a 14-bit immediate constant, the instruction sentence is as follows:

| LDERI | #123 |
|---|---| shifts arithmetically the ER to the left by the 14-bit length and operates to add the '123' of the operand part to the ER, if the EF is "1" before the execution of the instruction. The arithmetic-shift is an example of utilizing the ER which is used in the invention. Additionally, there is a method for filling from the low significance by an operand amount, a method for utilizing the ER with the operand being put in a fixed position for every instruction, etc. The ER can be used by a method so that the programmer is accessible in various manners. If the EF is "0" before the execution of the instruction, the central processing unit extends the sign of '123' that is an operand part of the instruction to make a 32-bit and store it in the ER. In both cases, the EF is set at "1".

The operand length of the instruction "LDERI" is determined according to the definition of another instruction, which is not limited to its length in the invention. If the example for using the immediate constant as an operand in the instruction 'LDERI' is given, it is noted that different types of operand such as a memory address, etc. can be used. For example, a PC relative addressing can be used. It means that the invention can have one or a plurality of instruction means for loading data into the ER.

The central processing unit having an extension instruction according to the invention has general instructions of prior arts, among which an instruction necessary for varying operands has the difference in interpreting the operand according to the EF status. For example, in the 32-bit central processing unit having a 16-bit fixed length instruction, an instruction 'JMP' having an 8-bit fixed length is represented as follows:

| JMP | offset |
|---|---|

The instruction 'JMP' is an instruction for changing the order of programs, which performs the instruction positioned away in an offset from the current program position next to the instruction. The offset position jumped is restricted within the range of −128 bytes to +127 bytes because the offset length is allotted by an 8-bit.

In this case, the offset is interpreted as two according to the status of the EF. First, if the 'EF' is '0', the offset length is interpreted as an 8-bit. If the 'EF' is '1', the central processing unit shifts arithmetically the value of the ER to the left by 8 bits and next adds the 8-bit offset represented in the instruction to calculate the offset. Therefore, the operand of the instruction is extended to have a 32-bit offset. The embodiment adapts a method for utilizing the ER by using the arithmetic-shift method among various ER utilizing methods.

The distances of moving the ER to the left are different according to the instruction. In the previous examples, the instruction 'LDERI' moves a 14-bit, and the instruction 'JMP' moves an 8-bit.

The EF flag becomes '1' by the instruction 'LDERI' and '0' in all instructions referring to the EF register except for the instruction 'LDERI'. But, the EF flag can have different values according to the embodied method and different embodifying aspects representing the status of the instruction extension.

Considering another example, when the operand length of 'LDERI' is a 12-bit in a 64-bit central processing unit having a 16-bit fixed length instruction, it is assumed that the operation of the programs is as follows:

| LDERI #opr1 | : INSTRUCTION - 1 |
|---|---|
| LDERI #opr2 | : INSTRUCTION - 2 |
| LDERI #opr3 | : INSTRUCTION - 3 |
| LDERI #opr4 | : INSTRUCTION - 4 |
| JMP | Offset : INSTRUCTION - 5 |

Assuming that the EF is '0' before the execution of 'INSTRUCTION-1', the ER has a value extended to the sign of 'opr1' to a 64-bit by 'INSTRUCTION-1', and the EF becomes '1'. The ER shifts arithmetically 'opr1' to the left by 12 bits, because the EF is '1' in INSTRUCTION-1' and has a value adding 'opr2'. It is also an example of the arithmetical shift to the left among the ER utilizing methods. At that time, if the exception occurs, the exception processing should be performed in advance without executing 'INSTRUCTION-3'.

In the central processing unit having an extension instruction according to the invention, because the EF and ER are registers and programs to permit the programer to access, their contents can be reserved in the manner storing them in stacks and buffers of the memory. After finishing the exception processing, if the ER and EF stored in the stack and memory are reloaded, the next instruction following by 'INSTRUCTION-3' can be properly performed. Also, even though another exception occurs during the exception processing, the ER and EF are stored and reloaded in sequence to secure the correct execution of the program. The offset length of the 'INSTRUCTION-5' is 48 bits resulting in that the operands from 'INSTRUCTION-1' to 'INSTRUCTION-4' are added to one another, to which the 8-bit offset that 'INSTRUCTION-5' has is added so as to obtain the length of 56 bits.

As a result, the central processing units having an extension instruction according to the invention are considered as what all instructions have a fixed length and are independently executed and can have operands of varying lengths.

FIG. 4 is a block diagram illustrating a register file architecture and an instruction format that an extension flag is set, according to the embodiment of a central processing unit having an extension instruction.

As shown in the drawing, each bit of a status register represents a predetermined state. Herein, it is noted that the 19th bit is an extension flag as described above which determines whether the next accompanied instruction takes a shorter value or an extended value as an offset or an immediate value. Of course, in the embodiment one bit in the status register for example, the 19th bit was used as a flag, but it is only one example and can be substantially embodied in a hardware through various methods.

Figure 2:
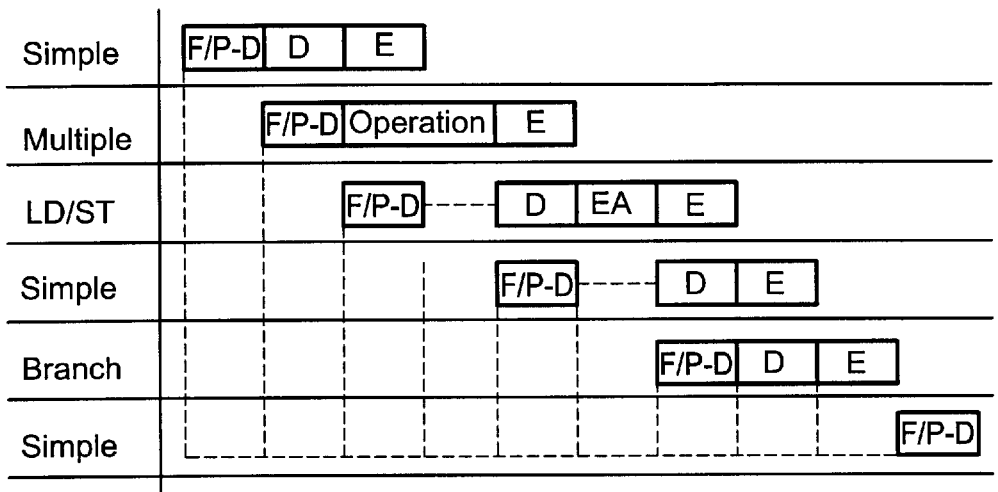
FIG. 2 is a block diagram illustrating the operation of a pipe line of the central processing unit.
Figure 3:
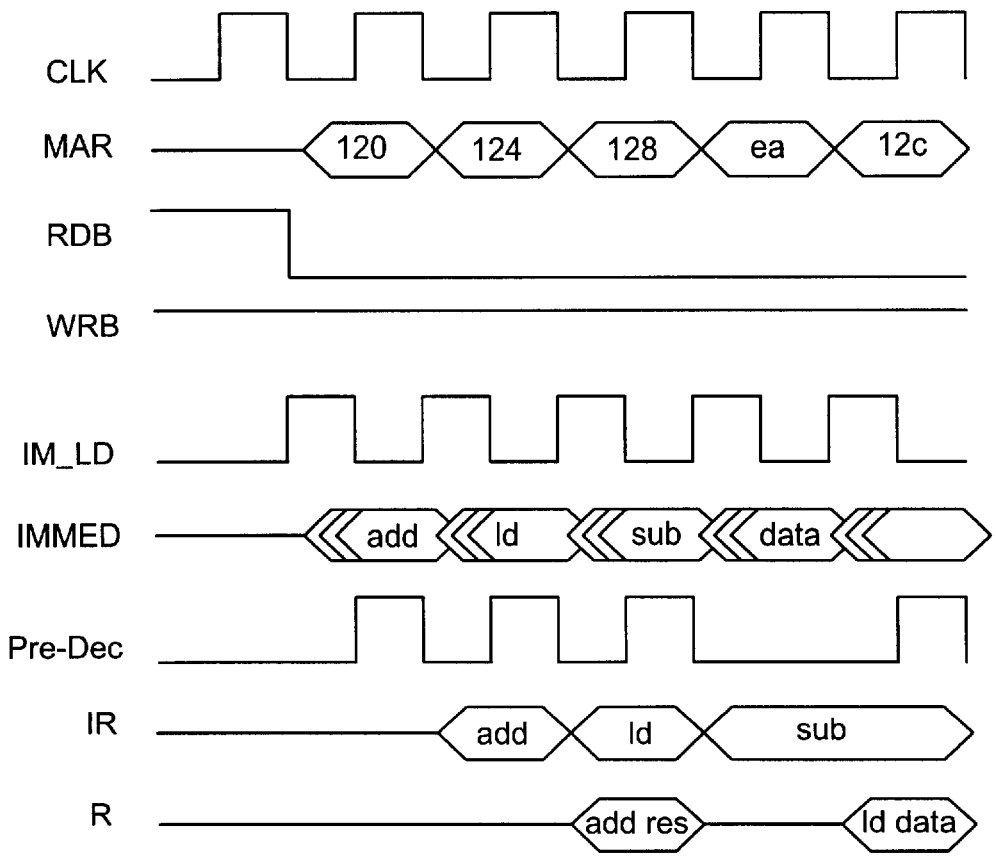
FIG. 3 is a block diagram illustrating the execution of the instruction fetching and decoding by the timing diagram of the pipe line.

FIG. 2 illustrates an example of how a pipeline of a MCU used in the embodiment is operated. As described above, a three stage pipeline of the fetch→the decode→the execution is used. It means the instruction each taken by one cycle in that the instruction called 'Simple' is fetched, decoded and executed. LD/ST is instruction that reads/writes from the memory, which additionally requires one more stage to obtain an effective address. Also, the central processing unit assists the multiple shift instruction without multiplying, dividing and barrel shifters, in which the multiple is an instruction that cannot finish the execution within such an one-cycle, in which the typical pipeline is represented for the instruction. FIG. 3 is schematically a timing sequence of a pipeline on how to force an instruction to be fetched, decoded and executed.

So far, the general operation flow of the invention was discussed. Next, the operation of an extension instruction in a 32-bit central processing unit having an extension instruction according to the invention will be described in detail as follows:

of which are filled up by the highest significant bits of immediate data as a sign extension. In the second case, because the 14 bits have been already filled in the ER in advance, the 14 bits of immediate data are filled up in the 13-bit to the 0-bit of the ER after shifting the 14 bits to the left in order to reserve the value. The arithmetic-shift is used as an example. In addition to the method, as described above, 27-bit to 14-bit can be filled up for the extension with the 13-bit to 0-bit being kept in itself. Through the above process, the repeated execution of the extension instruction can extend the offset and the immediate value, indefinitely.

Next, the operation of an instruction that can occur following the extension instruction will be explained.

First, on seeing how the instruction in data shifting instruction for reading data from the memory or writing data on the memory is operated as an address offset, the instruction will be defined as indicated in Table 2 for the convenience of the explanation.

TABLE 2

| | The one example of a 32-Bit Load/Store Instruction | | | | | | | | | | | | | | | |
|---|---|---|---|---|---|---|---|---|---|---|---|---|---|---|---|---|
| | 15 | 14 | 13 | 12 | 11 | 10 | 9 | 8 | 7 | 6 | 5 | 4 | 3 | 2 | 1 | 0 |
| IR[15:0] | & | & | & | & | # | # | # | # | * | * | * | * | % | % | % | % |

&: IR[15:12], OP - Code (Load/Store)
: IR[11:8], Source/Target Register
*: IR[7:4], Offset Data
%: IR[3:0], Index Register During the execution of the general instruction, no extension instruction, as described above rather, a MCU executes following two operations, when the extension instruction is generated.

First, the 19th bit of the status register is changed into '1' ('0' in case of the negative logic). If the 19th register is set at '1', the next instruction checks the flag. After that, if the instruction represents the operation of READ/WRITE, it operates forcing the ER to refer to it as an offset value, or if the instruction is the internal operation of an ALSU, it operates to force the ER to refer to it as an immediate value.

Second, the offset or immediate value to be intended is brought into the ER, in which there are two cases. In the first case, the extension instruction is used, initially, or the value of the ER has been already used, even through the extension instruction is issued in advance, and in the second case, the ER value is not used, although the extension instruction has been already executed in advance.

In order to explain it, assumed that the extension instruction is defined like the following table.

When the instruction is executed, the extension flag that is the 19th bit of the status register is firstly referred to in a decoder/control portion 50. If the flag value is '0' ('1' in case of the negative logic), the effective address represents a value adding the offset to the value of the index register. Herein, there is one item to consider about the data width of the memory, because various configurations are available such as the configuration, etc. in that four 8-bit memories can be connected to one another in parallel for a user's convenience or two 16-byte memories are connected to each other in parallel. As described above, it is assumed in the embodiment that four 8-bit memories can be connected in parallel to one another. In this case, at the time of adding the offset it is necessary to shift the offset value to the left by 2 bits. Thus, the 2 bits of the low significance are meaningless, because the instruction to be currently executed is a 32-bit Load/Store one. But, if the flag value is '1' ('0' in case of the negative logic), it means that the extension instruction was executed after a little while to shift the offset to be extended at the ER. Therefore, the effective address shifts the ER value to the left by 4 bits, in which the 2 bits of the low

TABLE 1

| | The one example of an Extension Instruction | | | | | | | | | | | | | | | |
|---|---|---|---|---|---|---|---|---|---|---|---|---|---|---|---|---|
| | 15 | 14 | 13 | 12 | 11 | 10 | 9 | 8 | 7 | 6 | 5 | 4 | 3 | 2 | 1 | 0 |
| IR[15:0] | & | & | * | * | * | * | * | * | * | * | * | * | * | * | * | * |

&: IR[15:14], OP - Code
*: IR[13:0], Immediate Data

In the first case, 14 bits as indicated in Table 1 are filled up in the 13-bit to 0-bit of the ER, the high significance bits significance among 4 bits included in the instruction are shifted to the left by 2 bits to add the value of the index register thereto and then obtain the effective address. Of course, the amount of the ER to be shifted to the left is variable based on the definition, but it is hereby defined as if only the 4 bits are shifted for the consistency of the instruction. In the example, the 32-bit Load/Store instruction enables an user to be accessed to the address till the index register +63. But, if the offset exceeds 63, the value exceeding 15 is shifted into the ER using the extension instruction and the 32-bit Load/Store instruction is executed to enable the user to have an or the access to the desirable address. It is represented as a simple arithmetic expression as follows:

When E-Flag is '0';

$$EA \leftarrow (\text{Zero extend IR[7:4]} \& \text{``00''}) + R_{index}$$

When E-Flag is '1';

$$EA \leftarrow (ER{<}{<}4 \& IR[5:4] \& \text{``00''}) + R_{index}$$

Second, considering a case where the immediate data value of the data shifting instruction is loaded, immediately, the instruction will be defined for itself as indicated in Table 3.

TABLE 3

The one example of a Load Immediate Data Instruction

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| IR[15:0] | & | & | & | & | # | # | # | # | * | * | * | * | * | * | * | * |

&: IR[15:12], OP - Code (Load Immediate Data)
: IR[11:8], Target Register
*: IR[7:0], Coded Immediate Data As it is apparent from Table 3, a signed 7-bit immediate value for example, −256 to +255 can be loaded into the target register through the load immediate instruction. But, if the requiring immediate value is beyond the scope of −256 to +255, the extension instruction is first executed to shift the desirable immediate value into the ER, and then the load immediate instruction is executed to obtain the desirable immediate value. In this case, the load immediate instruction is latched at the instruction register 40. In order to execute it, the 19th bit of the status register is referred to, when the decoder/control portion 50 generates a control signal. If the flag value is '0' ('1' in case of the negative logic), the 7-bit immediate value in the instruction for example, −256 to +255, is loaded into the target register and is shifted to the left by 4 bits and then the 4-bit of the low significance of the instruction is filled up in the shifted position to load a desirable size of the immediate value. Of course, the amount of the ER to be shifted to the left or the value to be filled up therein is quite changeable based on the definition of the instruction. If the 32-bit immediate value is requested by the instruction defined, the extension instruction is executed twice to shift the 24-bit of the high significance into the ER. Thereafter, the load immediate instruction is executed to obtain the 32-bit immediate value. It is represented as a simple arithmetic expression as follows:

When E-Flag is '0';

$$R_{dst} \leftarrow \text{Sign extend IR[7:0]}$$

When E-Flag is '1';

$$R_{dst} \leftarrow ER{<}{<}4 \& IR[3:01]$$

Third, seeing a case of ALU instruction, the instruction will be defined as indicated in Table 4 as follows:

TABLE 4

The one example of an ALU Instruction

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| IR[15:0] | & | & | & | & | & | & | & | & | # | # | # | # | * | * | * | * |

&: IR[15:8], OP - Code (ALU Instruction)
: IR[7:4], Target Register
*: IR[3:0], if E = '0', Source Register, except it an Immediate Register In general, the operand of the ALU instruction is classified into several types as follow:

① Calculation between two registers
② Calculation with the values of one register and immediate data
③ Calculation with the contents of one register and a memory But, in a general RISC architecture, the instruction except the Load/Store one is not accessed to the memory. Thus, in the architecture exemplified herein the ALU calculation is also classified into two types according to the characteristics of the general RISC, which is represented as one instruction as indicated in Table 4. The ALU instruction is latched at the instruction register 40. When the decoder/control portion 50 generates a control signal for the execution, the E-flag of the status register is referred to. If the E-flag is '0' (in case of positive logic), the instruction means the calculation between two registers. If the E-flag is '1', the instruction means the calculation with the values of one register and immediate data. In the first case, any one of 16 registers is selected through the 4-bit from the third bit to the lowest bit of the instruction so as to execute the calculation with the target register (IR[7:4]), so that the resulting value is recorded in the target register. On the contrary, the second case is what the target register and the ER register are referred to in order to add their contents to the immediate value. In other words, when the calculation is going to be executed with the immediate data value, the extension instruction is first executed to shift a desirable amount into the ER, and then the ALU instruction is executed. The example will be represented as a simple arithmetic expression as follows:

When E-Flag is '0';

$$R_{dst} \leftarrow R_{src} + R_{dst}$$

When E-Flag is '1';

$$R_{dst} \leftarrow (ER<<4 \ \& \ IR[3:0]) + R_{dst}$$

Fourth, looking at an example of a branch, the instruction will be defined as indicated in Table 5 for itself.

TABLE 5

The one example of a Branch Instruction

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| IR[15:0] | & | & | & | & | & | & | & | & | * | * | * | * | * | * | * | * |

&: IR[15:8], OP - Code (Branch Instruction)
*: IR[7:0], Offset Data

There can be various types of branch instructions, but program counter (PC) relative instruction is used as an example as indicated in Table 5. The instruction is latched at the instruction register 40. When the decoder/control portion 50 generates a control signal for the execution, the E-flag is also referred to therein. If the E-flag is '0', 8-bit having a sign is added into a program counter. For example, the scope of −512 to +511 can be branched into the program counter. Herein, the reasons in that the data length is a 8-bit and the scope is −512 to +511 are why the architecture adapted to the embodiment uses the 16-bit instruction and four memories having 8-bit data width are supposed to be connected in parallel to one another. Therefore, because the lowest significant bit is meaningless, because the substantial offset value becomes a 9-bit due to filling the lowest significant bits with '0'. On the contrary, if the E-flag is '1', the ER register on the program counter is referred to add the offset value in order to make an effective address to be branched. In other words, if the address to be branched is beyond the scope of −512 to +511, the extension instruction is first executed to shift a desirable amount into the ER, and then the branch instruction is executed to obtain necessary offset. The case will be represented as a simple arithmetic expression as follows:

when E-Flag is '0';

$$EA \leftarrow (Sign \ extend \ IR[7:0] \& `0') + PC$$

When E-Flag is '1';

$$EA \leftarrow (ER<<9 \ \& \ IR[7:0] \& `0') + PC$$

So far, in several typical types of many instructions the extension instruction was explained through some examples on how it is adapted. Though it is not explained herein, the instruction necessary for the offset or the immediate value is feasible for the adaption of the extension instruction in the same method as the above method, and it is not believed that the extensible amount is limited.

Now, seeing on how to process if the exception occurs when the extension instruction is executed, the core of the problem is two items on how the status is kept until the finishing of the exception processing, if the exception occurs during the executing of the extension instruction, and on how the offset or the immediate value is restored after the exception processing. As described above, the invention uses an E-flag and an ER in order to resolve the above problems. In order to embody these resolutions, the ER is put in the SPR and one bit in the status register is allotted to be used as the E-flag as shown in FIG. 4. Of course, it is a simple example for the purpose of facilitating the explanation among numerous methods for embodying the hardware of the invention.

According to the invention, most of the MUCs are used to store some elements in a stack region to prevent the ongoing program flow from being lost prior to the exception processing if the exception occurs. The architecture of the embodiment also stores the values of the program counter and status register in the stack region. Therefore, when the values of the program counter and status register are received back, the invention can resolve both problems in that the E-flag value is referred to keep the status, if the exception occurs during the execution of the extension instruction, and the ER is accessible in the software to shift the ER value into the stack region prior to the exception processing and then restores the ER value from the stack region after the exception processing takes place.

What is claimed is:

1. A method of extending a general instruction in a CPU, the method comprising:

receiving an extension instruction;

responsive to receiving the extension instruction, setting an extension flag;

responsive to receiving the extension instruction, storing, in an extension register, extension data included in the extension instruction;

receiving the general instruction;

if the extension flag is set, creating an extended instruction including 1) at least part of the general instruction and 2) at least part of the extension data of the extension register.

2. The method of claim 1, wherein the extension flag is included in a special register.

3. The method of claim 1, wherein the CPU is a 32 bit CPU.

4. The method of claim 1, wherein the CPU is a 64 bit CPU.

5. The method of claim 1, wherein the CPU is an 128 bit CPU.

6. The method of claim 1, wherein the extension register is programmer-accessible.

7. The method of claim 1, wherein the extension register is programmer accessible and the extension flag controls access to the extension register.

8. A general purpose central processing unit (CPU) comprising:

a set of machine instructions for operating the CPU;

one or more bus media for communication in the CPU;

an extension register coupled to at least one of the one or more bus media, the extension register storing an extension data;

a first instruction from the set of the machine instructions, the first instruction including an extension op code and one or more op fields, such that the op code instructs the CPU to concatenate the extension data to at least part of a second instruction from the set of the machine instructions to form an extended instruction.

9. The general purpose CPU of claim 8, further comprising:
an instruction register in communication with the extension register via at least one of the one or more bus media, wherein the first instruction and the one or more op fields is contained in the instruction register.

10. The general purpose CPU of claim 8, further comprising:
an extension flag indicating an active/inactive status of the extension register.

11. The general purpose CPU of claim 10, wherein the extension flag is a single bit in a special register.

12. The general purpose CPU of claim 8, wherein the CPU is a 32 bit CPU.

13. The general purpose CPU of claim 8, wherein the CPU is a 64 bit CPU.

14. The general purpose CPU of claim 8, wherein the CPU is a 128 bit CPU.

15. The general purpose CPU of claim 8, wherein the extension register is programmer accessible.

16. A central processing unit (CPU) comprising a register file including a plurality of general registers, an operational processor for operationally processing data stored in the register file, a general instruction comprised of an operand field storing an operational code and an operand, and an instruction decoder and controller for decoding the general instruction, to thereby generate a control signal and control operations of the operational processor based on the control signal, the CPU comprising:
an extension instruction comprised of an operand field storing an operational code and an operand; and
an extension register storing extension data,
wherein said instruction decoder and controller receives the operational code of the extension instruction, and decodes the received operational code, to thereby store the operand stored in the operand field of the extension instruction in the extension register as extension data, and operationally processes the operand stored in the operand field of the general instruction and the extension data stored in the extension register, during execution of the general instruction after execution of the extension instruction, to thereby use the operationally processed result as an operand for execution of the general instruction.

17. The CPU of claim 16, wherein extension data stored in the extension register can be stored in a memory or a general register, and data stored in a general register or a memory can be stored in the extension register as extension data.

18. The CPU of claim 16, wherein the extension data stored by the previously executed extension instruction in the extension register and the operand stored in the operand field of the extension instruction to then be executed is operationally processed to thereby store the operationally processed result in the extension register as extension data, when two or more extension instructions are in succession.

19. The CPU of claim 16, wherein, depending on the value of the extension data stored in the extension register during execution of the general instruction, the operand of the general instruction is used as an operand for execution of the general instruction, or the extension data stored in the extension register and the operand stored in the operand field of the general instruction are operationally processed, to thereby use the operationally processed result as an operand for execution of the general instruction.

20. The CPU of claim 16, wherein, depending on the value of the extension data stored in the extension register during execution of the extension instruction the operand stored in the operand field of the extension instruction is used in the extension register as extension data, or the extension data stored in the extension register and the operand stored in the operand field of the extension instruction are operationally processed, to thereby store the operationally processed result in the extension register.

21. The CPU of claim 16, wherein the extension data stored in the extension register and the operand stored in the operand field of the general instruction are operationally processed, to thereby execute the general instruction producing an operand for execution of the general instruction and then store data indicating that the extension register is empty, in the extension register.

22. A central processing unit (CPU) comprising a register file including a plurality of general registers, an operational processor for operationally processing data stored in the register file, a general instruction comprised of an operand field storing an operational code and an operand, and an instruction decoder and controller for decoding the general instruction, to thereby generate a control signal and control operations of the operational processor based on the control signal, the CPU comprising:
an extension instruction comprised of an operand field storing an operational code and an operand; and
an extension register accessible by a programmer, storing extension data; and
an extension flag which is activated by the extension instruction, wherein, depending on whether the extension flag is activated or inactive (i.e. its value), the instruction decoder and controller decodes the operational code of the extension instruction, to (if during the execution of a first extension instruction the extension flag is inactive i.e. its value=0), thereby store the operand stored in the operand field of the extension instruction in the extension register as extension data, and activates the extension flag, to thereby use the operand stored in the operand field of the general instruction, or (if during the execution of a general instruction the extension flag is active i.e. its value=1) use the operationally processed result obtained by operationally processing the extension data stored in the extension register and the operand stored in the operand field of the general instruction, as an operand for execution of the general instruction to deactivate the extension flag.

23. The CPU of claim 22, wherein extension data stored in the extension register can be stored in a memory or a general register, and data stored in a general register or a memory can be stored in the extension register as extension data.

24. The CPU of claim 22, further comprising an instruction which can alter the extension flag, to thereby change the state of the extension flag.

25. The CPU of claim 22, wherein, depending on the status of the extension flag, the operand stored in the operand field of the extension instruction is stored in the extension register as extension data, or the extension data stored in the extension register and the operand stored in the operand field of the extension instruction are operationally processed to thereby store the operationally processed result in the extension register.

* * * * *